Jan. 30, 1973 A. N. WRIGHT ET AL 3,713,874

PHOTOPOLYMERIZED POLYCARBOXYLIC ACID ANHYDRIDE FILM COATING AND PRODUCT, AND METHOD OF FORMING

Original Filed March 14, 1967

Inventors:
Archibald N. Wright,
Wilfred F. Mathewson Jr.,
by William A. Teoli
Their Attorney.

United States Patent Office

3,713,874

Patented Jan. 30, 1973

3,713,874

PHOTOPOLYMERIZED POLYCARBOXYLIC ACID ANHYDRIDE FILM COATING AND PRODUCT, AND METHOD OF FORMING

Archibald N. Wright, Schenectady, N.Y., and Wilfred F. Mathewson, Jr., Franklin, Mich., assignors to General Electric Company Original application Mar. 14, 1967, Ser. No. 622,944, now Patent No. 3,578,425. Divided and this application Dec. 15, 1970, Ser. No. 98,434
Int. Cl. B44d *1/50*
U.S. Cl. 117—93.31 10 Claims

ABSTRACT OF THE DISCLOSURE

A thin, continuous film is formed on a substrate by ultraviolet surface photopolymerization of a material in the gaseous phase. The material is selected from various anhydrides and dianhydrides. Such films, which can be selectively formed as electrically insulating or electrically conductive, are useful as coatings on metallic and non-metallic substrates, and for corrosion protection. The electrically insulating films are useful further as capacitor dielectrics, cryogenic device insulation, insulation for microelectric devices, and primer or insulation on electrically conductive wire, while the electrically conductive films can also be employed as conductive layers in microelectric devices.

Figures 1, 2, 3:
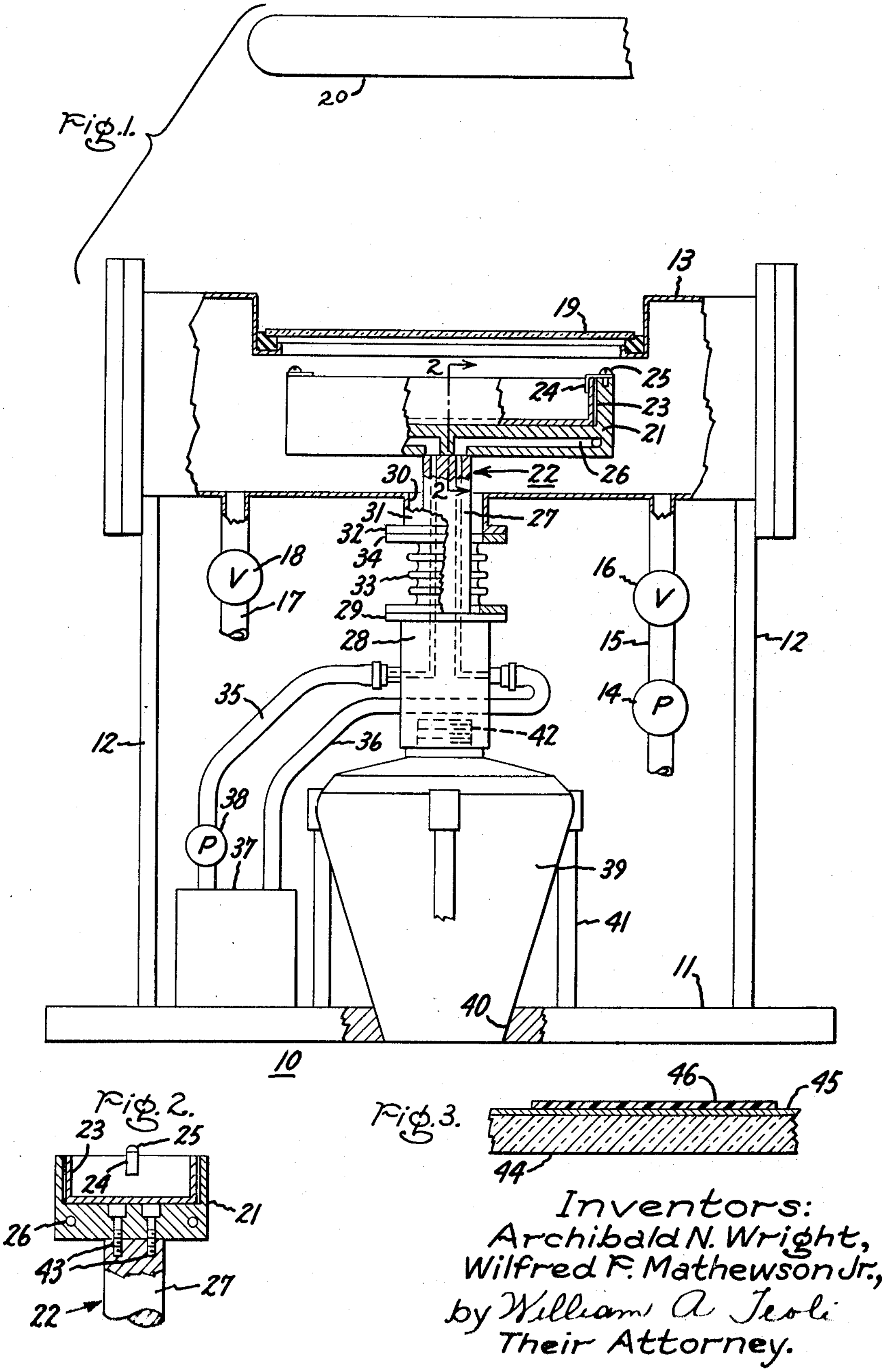

This application is a division of Ser. No. 622,944 filed Mar. 14, 1967, now Pat. No. 3,578,425.

This invention relates to photopolymerized films, coatings, and products including such films or coatings, and to methods of forming such films, coatings, and products, and more particularly to continuous films, coatings, composites and products formed by ultraviolet surface photopolymerization of a material in the gaseous phase and to methods of forming such films, coatings and products.

Thin films, which can be configuratively deposited are desirable for a wide variety of applications. It is further desirable that such thin films and coatings be adhesive to a substrate, and continuous thereon. The present invention is directed to improved thin films, coatings, composites and products having such films or coatings thereon which exhibit the above desirable characteristics and to methods of forming such films, coatings, and composites and products having such films or coatings. Such thin, electrically insulating films and coatings are formed by ultraviolet surface photopolymerization of a material in the gaseous phase, which material is selected from various anhydrides and dianhydrides. Such thin, electrically conductive films and coatings are formed by ultraviolet surface photopolymerizations of a dianhydride material in the gaseous phase on a substrate heated to a temperature of at least 250° C. For example, suitable anhydrides include phthalic anhydride, maleic anhydride, succinic anhydride, and hexahydrophthalic anhydride. Suitable dianhydrides include, among others, pyromellitic dianhydride, benzophenone dianhydride, ethylene glycol bis trimellitate anhydride, 2,3,6,7-naphthalene tetracarboxylic dianhydride, 3,3',4,4'-diphenyl tetracarboxylic dianhydride, 1,2,5,6-naphthalene tetracarboxylic dianhydride, etc., and a dianhydride with formula

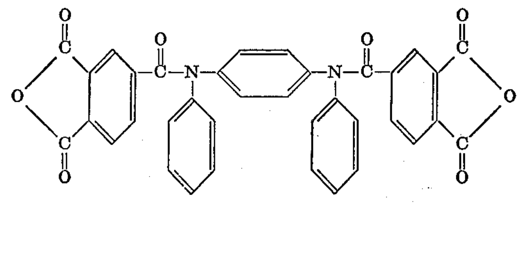

(I)

Benzophenone dianhydride includes 2,2',3,3'-, 2,3,3',4'-, and 3,3',4,4' - benzophenonetetracarboxylic acid dianhydride. The dianhydride of Formula I is prepared in accordance with Pat. 3,410,875, Fred F. Holub assigned to the same assignee as the present application.

In addition to being configuratively deposited, continuous and adhesive, the films and coatings formed in accordance with our invention exhibit good chemical resistance, have high dielectric strength and high dielectric constants or have good electrical conductivity, are imperforate, and exhibit good temperature stability. These films and coatings are useful for a wide variety of applications including covering layers for various metallic and nonmetallic substrates and for corrosion protection. The electrically insulating films are useful further as capacitor dielectrics, cryogenic device insulation, insulation for microelectric devices, and primer or as insulation on electrically conductive wire while the electrically conductive films can also be employed as conductive layers in microelectric devices. Films and coatings formed in accordance with our invention are also useful on diamonds, on cubic boron nitride (known as borazon) which is disclosed and claimed in U.S. Pat. 2,947,617, and in abrasive wheels using such coated diamonds or borazon imbedded in an organic matrix.

In Pat. 3,522,226 of Archibald N. Wright assigned to the same assignee as the present application, there are disclosed and claimed films, coatings, and products including such films or coatings formed by ultraviolet surface photopolymerization selected from the group consisting of hexachlorobutadiene, tetrafluoroethylene, trifluoromonochloroethylene, monofluorotrichloroethylene, hexafluorobutadiene, acrylonitrile, and mixtures thereof.

It is an object of our invention to provide a method of forming a continuous film in a predetermined pattern on a substrate by ultraviolet surface photopolymerization of a material in the gaseous phase, which material is selected from various anhydrides and dianhydrides thereby forming a product or composite.

It is another object of our invention to provide a method of forming such a continuous film which is electrically insulating from an anhydride or a dianhydride.

It is another object of our invention to provide a method of forming such a continuous film which is electrically conductive from a dianhydride on a heated substrate.

It is another object of our invention to provide a method of forming a continuous coating on a substrate by ultraviolet surface photopolymerization of such a material in the gaseous phase and removing subsequently the substrate by chemical etching.

It is a further object of our invention to provide a product having a substrate with a continuous film adhering to at least one surface thereof, which film is produced by ultraviolet surface photopolymerization of an anhydride or dianhydride in the gaseous phase.

In accordance with our invention, a thin, continuous film can be formed by ultraviolet surface photopolymerization of a material in the gaseous phase, which material is selected from the class consisting of anhydrides and dianhydrides.

These and various other objects, features and advantages of the invention will be better understood from the following description taken in connection with the accompanying drawing in which:

FIG. 1 is a side elevational view partially in section of an apparatus for forming films, coatings and products in accordance with our invention; and FIG. 2 is a sectional view of a portion of the apparatus taken on line 1—1 of FIG. 1; and FIG. 3 is a sectional view of a substrate with a continuous film thereon formed in accordance with our invention.

In FIG. 1 of the drawing, an apparatus is shown generally at 10 for forming films, coatings and products having such films or coatings thereon in accordance with our invention. A base 11 is provided on which is mounted a pair of support members 12. An enclosure 13 is positioned upon support members 12. A vacuum pump 14 is connected by a line 15 to enclosure 13 to evacuate the latter. A control valve 16 is provided in evacuation line 15. An inlet line 17 is connected at one end to enclosure 13 and at its other end to a source (not shown) of material to be supplied in gaseous form to enclosure 13. A control valve 18 is provided in line 17 to control the supply of material to enclosure 13. An ultraviolet light transmitting window 19 is shown positioned in the upper wall portion of enclosure 13 and is removed therefrom. An ultraviolet light 20, which is normally provided with a reflector (not shown), is shown outside and spaced above enclosure 13 in alignment with window 19. Light 20 is supported in any suitable manner. However, light 20 can be positioned inside enclosure 13. Such a light source provides ultraviolet light in the region of about 2,000 to 3,500 angstroms, and which is directed by its reflector (not shown) through window 19 into enclosure 13. A metal hood (not shown) is also positioned around the enclosure and light source. A substrate support member 21 is positioned within enclosure 13 and connected to the driven end of a driver shaft 22. A tray or container 23 is located within the upper recessed portion of member 21 to provide a container for material to be used during the operation of apparatus 10. Brackets 24 are shown at opposite ends of tray 23, which brackets are fastened by means of screws 25 to support member 21. A cooling tube 26 is imbedded in substrate support member 21 to provide cooling for the member, associated tray 23 and material placed in tray 23.

Since apparatus 10 is useful for coating diamonds, borazon and other particle material, there is provided a driver shaft 22 which has an upper drive portion 27 and a lower driven portion 28. Driver portion 27 of shaft 22 has a smaller diameter than driven portion 28. Shaft 22 is shown with a flange 29 at the junction of portions 27 and 28. Driven portion 27 of shaft 22 extends through an aperture 30 in the wall of enclosure 13. A closure 31 with an associated flange 32 extends outwardly from and surrounds aperture 30. A diaphragm 33 with a flange 34 at each end is connected by means of these flanges to associated flange 32 of closure 31 and to flange 29 on driver shaft 22. In this manner, a vacuum can be maintained in enclosure 13 while shaft 22 can be vibrated. Tube 26 within substrate support member 21 continues through the interior of shaft 22 and is connected to an inlet tube 35 and an outlet tube 36. Tubes 35 and 36 are connected to a cooling unit 37 which is shown positioned outside enclosure 13 and supported on base 31. Unit 37 consists of, for example, a Dewar flask in which is positioned a coil connected to the ends of tubes 35 and 36, and which is filled with ice. A thermometer (not shown) is positioned in the ice to record the temperature within unit 37. Other cooling units, such as a heat exchanger or a refrigeration device, can also be employed. A circulating pump 38 is connected to inlet tube 35 to circulate a coolant through tube 35, tube 26 and outlet tube 36. A wide variety of coolants might be employed, for example, water or ethanol.

A vibratory device 39 is shown positioned in a recess 40 in base 11. A plurality of support members 41 are attached to base 11 and to device 39 to position the device. The upper end of device 39 fits into a recess 42 in the end of a driven portion 28 of shaft 22. For example, a multi-impedance driver unit might be employed for device 39.

In FIG. 2 of the drawing, there is shown a sectional view of a portion of apparatus 10 taken on line 1—1 of FIG. 1. In FIG. 2 the end of driver portion 27 of shaft 22 is shown connected to substrate support member 21 by means of threaded fasteners 43. In this manner, the drive end 27 of shaft 22 is connected to substrate support member 21 and positions this member within enclosure 13.

In FIG. 3 of the drawing, there is shown a glass substrate support 44 with a 0.25 micron thick aluminum film substrate 45 thereon. A continuous film 46 is shown adhering firmly to the upper surface of the aluminum film 45 in accordance with the method of our invention using the apparatus shown in FIG. 1.

We have discovered unexpectedly that a continuous, imperforate film could be formed which comprises photopolymerizing a material in the gaseous phase, which material is selected from the class consisting of anhydrides and dianhydrides on the surface of a substrate member with ultraviolet light at a relatively low vapor pressure for the gaseous material. The preferred effective wave length of the ultraviolet light is in the range of 2,000 angstroms to 3,500 angstroms, while the preferred vapor pressure for the material in the gaseous phase is in the range from 0.1 to 4.0 millimeters of mercury. We have found further that subsequent to the formation of the above type of continuous film formed on the substrate, the substrate could be removed, for instance, by chemical etching with hydrochloric acid or hydrofluoric acid, thereby providing an unsupported body of the film.

We found unexpectedly that our unique film formed from an anhydride or a dianhydride was electrically insulating if the temperature of the substrate member on which the film was deposited was at a temperature which did not exceed 200° C. We found further that our unique film formed from a dianhydride was electrically conductive if the substrate was maintained at a temperature of at least 250° C. during the ultraviolet surface photopolymerization of the monomer. We discovered also that an anhydride would not form an adherent, electrically conductive film when the substrate was heated similarly to a temperature of at least 250° C.

When an electrically conductive film is formed, the exterior quartz surface of the ultraviolet light can be employed as the substrate when the lamp is positioned within the enclosure since the quartz surface attains a temperature of about 300° C. Other suitable sources can also be used to heat the substrate to a temperature of at least 250° C. whereby an electrically conductive film forms thereon. Such sources include a heat gun and an infrared lamp. When an electrically insulating film is formed, the temperature of the substrate can be maintained at a temperature which does not exceed 200° C. by cooling the substrate.

We found further that many metallic and non-metallic substrates can be employed in various forms and configurations such as tubes, filaments, fibers, yarn, whiskers and particles. For example, such a film is formed on metallic substrates including lead, niobium, copper, gold, steel, iron, brass and aluminum. Various non-metallic materials can be used such as glass, quartz, mica, carbon, and boron.

In an illustrative operation of the apparatus shown in FIG. 1 of the drawing, tray 23 is filled with a monolayer of diamond particles, which tray had been affixed previously to substrate support block 21. Window 19 is then positioned in the upper wall of enclosure 13. Vacuum pump 24 is started and pumped down the chamber defined by enclosure 13 to a pressure of about one micron. Valve 16 is then closed. A material, which is photopolymerizable in its gaseous state, is supplied from a solid source (not shown), such as pyromellitic dianhydride, which is positioned in an area which will be shaded in enclosure 13.

The monomer, pyromellitic dianhydride, is heated by a suitable heating source (not shown) to about 150° C. to provide a vapor pressure of about 100 microns. Ultraviolet lamp 20 is shown positioned outside and in alignment with window 19 and substrate support member 21. However, lamp 20 can be positioned inside enclosure 13.

In the latter event, no additional heating source is required to vaporize the solid material. The lamp, which has a preferred effective wave length in the range of 2,000 to 3,500 angstroms, is turned on whereby the temperature of the substrate support member 21 increases but does not exceed 200° C. and the vapor pressure rises. A metal hood (not shown) is positioned around apparatus 10 since this particular light source is used.

Vibratory device 39 is turned on, whereupon shaft 22 is vibrated. Substrate support member 21, which is connected to the driven end of shaft 22, is vibrated by shaft 22, which vibration causes the diamond particles in tray 23 to move in a random fashion. In this manner, a larger surface area of the particles is exposed to both the monomer and the light source during the operation of the apparatus.

After a period of time, lamp 20 is shut off, vibratory device 39 is turned off, and the system is pumped down to about 10 microns pressure to remove all by-products. The metal hood is removed and the vacuum is broken. Enclosure 13 is cooled to room temperature and, subsequently, window 19 is removed. Tray 23 is removed from substrate support member 21 and the diamond particles in the tray are examined. The particles have a color as opposed to the gray color of the initial uncoated diamonds. Upon further examination under a microscope these diamond particles show an adherent, thin, continuous, imperforate film formed on at least a portion of the faces of the diamond particles. Such electrically insulating films are useful for bonding the diamonds to wheel matrices.

In a second illustrative operation of the apparatus shown in FIG. 1 of the drawing, a substrate support in the form of a 1 inch x 3 inches glass microscope slide with a 0.25 micron thick aluminum film substrate thereon was positioned on support block 21. A stainless steel light mask of dimensions 1 inch x 3 inches with three slots therein was placed on the upper surface of the aluminum film substrate thereby covering the film substrate except for the slots.

Window 19 is then positioned in the upper wall of enclosure 13. Vacuum pump 24 is started and pumped down the chamber defined by enclosure 13 to a pressure of about one micron. Valve 16 is then closed. A material, which is photopolymerizable in its gaseous state, is supplied from a solid source (not shown), such as pyromellitic dianhydride, which is positioned in an area which will be shaded in enclosure 13.

The monomer, pyromellitic dianhydride, is heated by a suitable heating source (not shown) to about 150° C., to provide a vapor pressure of about 100 microns. Ultraviolet lamp 20 is positioned outside and in alignment with window 19 and substrate support member 21. The lamp is turned on whereby the temperature of the substrate support member 21 increases and the vapor pressure rises. A metal hood (not shown) is positioned around apparatus 10 since this particular light source is used.

Pump 38 is turned on and a coolant, such as ethanol, is circulated through inlet tube 35, tube 26, and outlet tube 36, thereby cooling substrate support member 21, the substrate support and its associated aluminum film substrates whereby the associated temperatures do not exceed 200° C.

After a period of time, lamp 20 is shut off, and the system is pumped down to about 10 microns pressure to remove all by-products. The metal hood is removed and the vacuum is broken. Enclosure 13 is cooled to room temperature and, subsequently, window 19 is removed. The light mask is lifted off the aluminum film substrate and the substrate support member removed from substrate support member 21. Examination showed an adherent, thin, continuous, imperforate, electrically insulating film had been formed on the areas of the aluminum film substrate which were in registry with the three openings in the light mask. Infrared analysis of films deposited from pyromellitic dianhydride on evaporated aluminum substrates demonstrated that the (substituted) aromatic ring had been retained in the polymerized product. Evidence was also obtained for retention of the cyclic C=O group characteristic of anhydrides. Significant infrared absorption appeared to be due to OH groups present in the polymeric material.

In a third illustrative operation of the apparatus shown in FIG. 1 of the drawing, ultraviolet lamp 20 is positioned within enclosure 13. The exterior quartz surface of the lamp is employed as the substrate, while the lamp provides both heat for the substrate, and provides ultraviolet light for the surface photopolymerization. Window 19 is then positioned in the upper wall of enclosure 13. Vacuum pump 24 is started and pumped down the chamber defined by enclosure 13 to a pressure of about one micron. Valve 16 is then closed. A dianhydride material, which is photopolymerizable in its gaseous state, is supplied from a solid source (not shown), such as pyromellitic dianhydride which is positioned within enclosure 13.

The monomer, pyromellitic dianhydride, was heated to about 300° C., by the ultraviolet lamp, whose exterior quartz surface attained a temperature of about 300° C., to provide a vapor pressure of about 1000 microns. A metal hood (not shown) is positioned around apparatus 10 since this particular light source is used.

After a period of about 15 minutes an adherent coating was formed on the exterior quartz surface of the lamp whereby the lamp did not transmit further light, but glowed with a reddish color. The lamp was shut off and the system was pumped down to about 5 microns of pressure to remove all by-products. The metal hood was removed and the vacuum was then broken. Enclosure 13 was cooled to room temperature and, subsequently, window 19 was removed. The lamp was removed from the enclosure. Examination showed an adherent, thin, continuous, imperforate film had been formed on the entire outer quartz surface of the lamp. This coating exhibited electrical conductivity with a rather uniform resistance of 100 ohm/linear cm. Subsequently, the adherence of the coating was tested by attempted removal by alcohols, ketones, sodium hydroxide and concentrated hydrofluoric acid. The coating was very chemically stable in that none of the above solvents removed the coating from the lamp.

Examples of films, coatings, and composites and products including such films and coatings embodying our invention and methods of making such films, coatings, and composites and products including such films and coatings in accordance with our invention are set forth below:

EXAMPLE I

Apparatus was set up in accordance with FIG. 1 of the drawing. A substrate support, a microscope glass slide 1 inch x 3 inches, which was provided with a 0.25 micron thick aluminum film substrate thereon, was positioned on the support block in the enclosure. A stainless steel light mask 1 inch x 3 inches and having three slots therein was placed on the surface of the aluminum substrate. Solid pyromellitic dianhydride was placed on the support block in an area to be shaded from the light source. An ultraviolet light source, in the form of an Hanovia 700 watt lamp with a reflector was positioned outside the enclosure and above the upper surface of the aluminum film substrate. The window was then positioned in the upper wall of the enclosure. The system was pumped down to a pressure of one micron and the control valve was closed. A metal hood was positioned around the apparatus. The pyromellitic dianhydride was heated by a heat gun to about 150° C., to provide a vapor pressure of 100 microns. The lamp, which had an effective wave length in the range from 2,000 to 3,500 angstroms, was turned on. During photopolymerization, which was continued for 60 minutes under the light source, the monomer pressure rose to about 2 torr. In this operation, a film was formed on the aluminum film substrate by ultraviolet surface photopolymerization of pyromellitic dianhydride in the gaseous phase.

While it is not shown in the drawing, a plurality of thermocouples was provided to measure the temperature of the evaporated aluminum film to provide temperature information. Cooling means for the substrate support member, which are shown in FIG. 1 of the drawing and described above, were not employed in this example. An average temperature of 160° C. was obtained for the aluminum film. The process was concluded by turning off the ultraviolet pump control valve, and pumping down the interior of the enclosure to a pressure of about 10 microns to remove gaseous material and any by-products therefrom. The vacuum was then broken and the window was removed. The light mask was removed and the aluminum film on the glass substrate was examined. Visual examination disclosed three separate thin films, each of which was continuous. The film was measured by capacitance and showed a capacitance of 1.1 to 1.4 x $10^{-9}$ farads for counterelectrode area of 0.1 cm.$^2$.

Thus, a product was obtained from this example which comprised a glass base with an aluminum film substrate thereon, on which a continuous, thin, imperforate, electrically insulating film adhered to the upper surface of the substrate.

EXAMPLE II

In the following example, the same apparatus, monomer, and procedures were followed as in Example I. However, a glass substrate was employed. After 60 minutes of ultraviolet surface irradiation during which the substrate temperature was controlled at a maximum temperature of 200° C., the glass film substrate was examined. Three separate, continuous films adhered to the substrate.

EXAMPLE III

In this example, the same apparatus, monomer, and procedures were followed as in Example I. However, a glass substrate was employed which had an evaporated film of gold thereon. After 48 minutes of ultraviolet surface photopolymerization during which the substrate temperature was controlled at a maximum temperature of 200° C., the glass film substrate was examined. A visible, continuous film adhered to the gold film.

EXAMPLE IV

In this example, the same apparatus, monomer, and procedures were followed as in Example I. However, the lamp was positioned inside the enclosure and the substrate was evaporated aluminum. The monomer was heated to a temperature of about 300° C., to provide a vapor pressure of 1,000 microns while the substrate temperature was controlled at a maximum temperature of 200° C. After 30 minutes of ultraviolet surface photopolymerization, examination of the aluminum substrate disclosed three separate, continuous, electrically insulating films adhering to the substrate. With counterelectrode area 0.1 cm.$^2$, capacitance readings over the coated area varied from 13.0 to 13.8 x $10^{-9}$ farads.

EXAMPLE V

In this example, the same apparatus and procedures were followed as in Example I. However, the lamp was positioned inside the enclosure and phthalic anhydride was employed as the monomer. The monomer was heated to a temperature of about 300° C., to provide a vapor pressure of 1,000 microns. After 30 minutes of ultraviolet surface photopolymeriaztion during which the substrate temperature was controlled at a maximum temperature of 200° C., the film showed an average capacitance of 2.5 x $10^{-9}$ farads for counterelectrode of area 0.1 cm.$^2$.

EXAMPLE VI

In this example, the same apparatus, monomer, and procedures were followed as in Example I. In the present example, the substrates were a plurality of seven inch lengths of carbon yarn, each of which comprised a large number of twisted carbon filaments. The yarn, which was commercially available, was provided with a polyvinyl alcohol sizing. This sizing was removed prior to the deposition of the film on the yarn by a hot water rinse. The plurality of seven inch lengths of the yarn were rinsed twice in a single length by soaking in hot water for two separate 15 minute periods, after which the yarn was dried. The monomer was heated to a temperature of about 150° C., to provide a vapor pressure of 100 microns. After 30 minutes of ultraviolet surface photopolymerization, the equipment was shut down, and the yarn lengths were shaken to rearrange them. An additional 30 minutes of ultraviolet surface photopolymerization was employed to coat previously unexposed portions of the yarn. The temperature of the yarn did not exceed 200° C. Visual examination disclosed that portions of the yarn lengths had been coated with a continuous adherent film.

EXAMPLE VII

Apparatus was again set up in accordance with FIG. 1 of the drawing. Twelve grams of 80/100 mesh diamond particles were spread on an aluminum tray about six inches long and one inch wide. The tray was placed on the upper recessed portion of the substrate support member. The window was then positioned in the upper wall of the enclosure. An ultraviolet light source, in the form of a Hanovia 700 watt lamp with a reflector, was positioned outside the enclosure and in alignment with the substrate support member. The system was pumped down to a pressure of five microns of mercury and the control valve was closed. Solid pyromellitic dianhydride was positioned in an area which would be shaded subsequently. A metal hood was positioned around the apparatus. The pyromellitic dianhydride was heated to about 150° C. by suitable heating means (not shown) to provide a vapor pressure of about 100 microns. The lamp was then turned on.

The circulating pump was started and ethanol was flowed through the substrate support member. The vibratory device was activated thereby vibrating the diamond particles in the tray. The cooling unit reduced the temperature of the substrate support member, tray and diamond particles to a substrate temperature of about 162° C., resulting in a substantial rate increase in the film formation and a shortening of the time involved. After 30 minutes, the process was concluded by turning off the ultraviolet light source and the vibratory device, stopping the circulating pump, removing the hood, opening the vacuum pump control valve, and pumping down the interior of the enclosure to a pressure of about one micron of mercury to remove gaseous material and any by-products therefrom. The vacuum was then broken and the window was removed from the enclosure. The tray with diamond particles is lifted up from the substrate support member. Visual examination disclosed an adherent film on at least a portion of the faces of the diamond particles.

EXAMPLE VIII

An abrasive grinding wheel with coated diamond particles as described above in Example VII was made. An abrasive grinding wheel was made in which uncoated diamond particles were employed. Each of the wheels was 5 inches in diameter by 3/16 inch thick. The aluminum wheel core was 4¾ inches in diameter and had a 1¼ inch arbor hole. The abrasive rim, which was ⅛ inch by 3/16 inch in cross section, contained a 5.46 grams of 80/100 mesh diamond particles, 7.2 grams of FFF grade silicon carbide, and 3.08 grams of 5417 Bakelite phenolic resin. The wheel core and abrasive mix were placed in a compression mold. The loaded mold was placed on a heated platen press, pressed for 30 minutes at about 177° C. at 20,000 pounds of force to stops, then 4,000 pounds with stops removed.

The wheels were then post cured for 17 hours with a maximum temperature of about 190° C. for 12 hours.

The above wheels were tested on a Norton surface grinder under the same conditions to determine the respective grinding ratios, the general measurement of wheel performance. A table speed of 50 feet per minute, a cross feed of 0.050 inch, a downfeed of 0.001 inch per pass, a total downfeed of 0.025 inch, and a wheel speed of 4,900 feet per minute were employed. Wheel performance was judged in terms of grinding ratio, which is the volume of carbide ground (grade 370 tungsten carbide) per volume of wheel wear.

The wheel with the uncoated diamond particles showed a grinding ratio of 109. The grinding ratio of the other wheel which incorporated coated diamond particles was initially extremely high at about 300. This value decreased to 140 after continued wet grinding.

EXAMPLE IX

Apparatus was set up in accordance with FIG. 1 of the drawing. Solid pyromellitic dianhyride was placed on the support block within the enclosure. An ultraviolet light source, in the form of a Hanovia 700 watt lamp with a reflector was positioned within the enclosure and above the upper surface of the support block. The window was then positioned in the upper wall of the enclosure. The system was pumped down to a pressure of 5 microns and the control valve was closed. A metal hood was positioned around the apparatus. The lamp, which had an effective wave length in the range from 2,000 to 3,500 angstroms, was turned on. The pyromellitic dianhydride was heated to about 300° C., by the ultraviolet lamp whose exterior quartz surface attained a temperature of about 300° C., to provide a vapor pressure of 1,000 microns. During photopolymerization, which was continued for about 15 minutes under the light source, the monomer pressure rose to about 4,000 microns. In this operation, a film was formed on the exterior quartz surface of the lamp by ultraviolet surface photopolymerization of pyromellitic dianhydride in the gaseous phase. At the end of this time period, the coated lamp did not transmit further light, but glowed with a reddish color.

The process was concluded by turning off the ultraviolet lamp, removing the hood, opening the vacuum pump control valve, and pumping down the interior of the enclosure to a pressure of about 10 microns to remove gaseous material and any by-products therefrom. The vacuum was then broken and the window was removed. The coated lamp was removed. Visual examination disclosed an adherent, thin, continuous, imperforate film formed on the entire outer quartz surface of the lamp. This film exhibited electrical conductivity with a rather uniform resistance of 100 ohm/linear cm.

EXAMPLE X

In the following example, the same apparatus, lamp type and procedures were followed as in Example IX. However, an anhydride rather than a dianhydride was employed. Phthalic anhydride was heated to 300° C., by the ultraviolet lamp whose exterior quartz surface attained a temperature of about 300° C., and the photopolymerization continued for a similar period of 15 minutes. While a film formed on the lamp substrate, it peeled off spontaneously.

EXAMPLE XI

In this example, the same apparatus, dianhydride material and procedures are followed as in Example IX. However, the substrate is aluminum foil which is heated to a temperature of about 300° C. by a heat gun adjacent the substrate. The lamp is positioned outside of the enclosure. After 15 minutes of ultraviolet surface irradiation, a continuous, thin, imperforate, electrically conductive film is formed on the surface of the aluminum foil.

EXAMPLE XII

Apparatus is again set up in accordance with FIG. 1 of the drawing. Three grams of 80/100 mesh diamond particles are spread on an aluminum tray about six inches long and one inch wide. The tray is placed in the upper recessed portion of the substrate support member. An ultraviolet light source, in the form of a Hanovia 700 watt lamp with a reflector, is positioned outside the enclosure and in alignment with the substrate support member. The window is then positioned in the upper wall of the enclosure. The system is pumped down to a pressure of 5 microns of mercury and the control valve is closed. Solid pyromellitic dianhydride is positioned in the enclosure in an area which is shaded from the light. A metal hood is positioned around the apparatus. A heat gun is used to raise the temperature of the diamond particles to about 300° C. The same heat source is used to heat the solid pyromellitic dianhydride and convert this monomer to its gaseous state. The lamp and vibratory device are turned on.

After 15 minutes, the process is concluded by turning off the ultraviolet light, and the vibratory device, removing the hood, opening the vacuum pump control valve, and pumping down the interior of the enclosure to a pressure of about one micron of mercury to remove gaseous material and any by-products therefrom. The vacuum is then broken and the window is removed from the enclosure. The tray with diamond particles is lifted up from the substrate support member. Visual examination discloses an adherent film on at least a portion of the faces of the diamond particles. The film is electrically conductive.

While other modifications of the invention and variations thereof which may be employed within the scope of the invention have not been described, the invention is intended to include such as may be embraced within the following claims.

What we claim as new and desire to secure by Letters Patent of the United States is:

1. A method of forming a continuous film which comprises ultraviolet surface photopolymerization on a substrate of a material in the gaseous phase, which material is selected from the class consisting of polycarboxylic acid anhydrides or dianhydrides.

2. The method as in claim 1, in which the material in gaseous phase is pyromellitic dianhydride.

3. The method as in claim 1, in which the material in gaseous phase is phthalic anhydride.

4. The method as in claim 1, in which there is provided an enclosure, a substrate is positioned within the enclosure, the enclosure is evacuated, the gaseous material is introduced into the enclosure, a vapor pressure is maintained for the material in the gaseous phase in the range of 0.1 to 4.0 millimeters of mercury, the material in the gaseous phase is photopolymerized on the surface of the substrate with ultraviolet light having an effective wave length in the range of 2,000 angstroms to 3,500 angstroms.

5. The method as in claim 1, in which the substrate member is cooled during photopolymerization thereby increasing the rate of film formation.

6. The method as in claim 1, in which the material is a dianhydride and the substrate is heated to a temperature of at least 250° C.

7. The method as in claim 6, in which the dianhydride is pyromellitic dianhydride.

8. A composite article comprising a carbon yarn, and an adherent film on at least a portion of said yarn, said film made in accordance with the method of claim 2.

9. A product comprising a substrate, and an adherent, thin, electrically conductive, continuous film on said substrate, said film consisting of an ultraviolet surface photopolymerized polycarboxylic acid dianhydride.

10. A product as in claim 9, in which the dianhydride is pyromellitic dianhydride.

References Cited

UNITED STATES PATENTS

| | | | |
|---|---|---|---|
| 3,186,972 | 6/1965 | Lans et al. | 204—159.22 |
| 3,392,051 | 7/1968 | Caswell et al. | 117—93.31 |
| 3,417,063 | 12/1968 | Dunkel | 260—78.4 R |
| 3,440,215 | 4/1969 | Holub | 260—47 CP |
| 3,506,583 | 4/1970 | Boram et al. | 260—78.4 R |
| 3,619,259 | 11/1971 | Wright et al. | 204—159.11 |

ALFRED L. LEAVITT, Primary Examiner

J. H. NEWSOME, Assistant Examiner

U.S. Cl. X.R.

117—106 R, 161 R; 204—159.11; 260—63 K, 78.4 R